United States Patent [19]

Ballantine et al.

[11] 3,951,940
[45] Apr. 20, 1976

[54] METHOD OF PRODUCING A HARDENED GELATIN LAYER USING AQUEOUS SOLUTION OF A 2-HALOGENO PYRIDINIUM COMPOUND

[75] Inventors: John Douglas Ballantine; Norman Alfred Smith, both of Ilford, England

[73] Assignee: Ciba-Geigy AG, Basel, Switzerland

[22] Filed: Sept. 30, 1974

[21] Appl. No.: 510,941

[52] U.S. Cl.................................. 260/117; 96/111; 106/125
[51] Int. Cl.² ...................... C09H 7/00; G03C 1/30
[58] Field of Search..................... 260/117; 106/125; 96/111

[56] References Cited
UNITED STATES PATENTS

| | | |
|---|---|---|
| 3,396,127 | 8/1968 | Burness et al. ................. 260/117 X |
| 3,511,849 | 5/1970 | Wilson ........................... 260/117 X |
| 3,792,021 | 2/1974 | Tschopp et al. ................ 260/117 X |
| 3,826,788 | 7/1974 | Froehlich et al................ 260/117 X |
| 3,880,665 | 4/1975 | Himmelmann.................. 260/117 X |

FOREIGN PATENTS OR APPLICATIONS 2,335,092   1/1974   Germany

OTHER PUBLICATIONS

J. Organic Chemistry, 16, pp. 1143–1144 (1951), Bradlow et al.
Chem. Abstracts, Vol. 80, 1974, 114783q, Ballantine et al.

*Primary Examiner*—Howard E. Schain
*Attorney, Agent, or Firm*—Wenderoth, Lind & Ponack

[57] ABSTRACT

This invention relates to the hardening of gelatin layers. The gelatin is heated with an aqueous solution of a 2-halogeno pyridinium compound.

8 Claims, No Drawings

METHOD OF PRODUCING A HARDENED GELATIN LAYER USING AQUEOUS SOLUTION OF A 2-HALOGENO PYRIDINIUM COMPOUND

According to the present invention there is provided a method of producing a hardened gelatin layer which comprises treating an aqueous gelatin solution with an aqueous solution of a compound of the formula

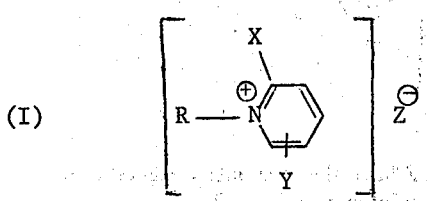

(I)

where X is a halogen atom, Y is a hydrogen or a halogen atom, Z is an anion and R is an alkyl, aralkyl, or aroylalkyl group, or a group of the formula

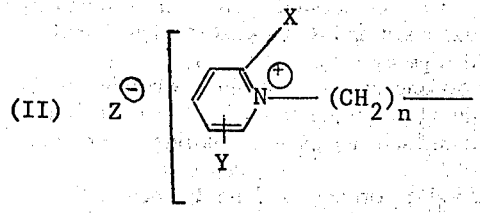

(II)

where X, Y and Z have the meanings assigned to them above and n is an integer of 2 to 12.

When the compound of use in the present invention is a mono(2-halopyridinium) salt, Y is preferably a halogen atom in the 2 or 4 positions.

Further in regard to the mono(2-halopyridinium) salt particularly useful compounds are those wherein R is methyl, phenylethyl and benzoylmethyl.

Particularly preferred compounds are those wherein X is chlorine or bromine.

When the compound of use in the present invention is a bis(2-halopyridinium) salt preferred compounds have the formula

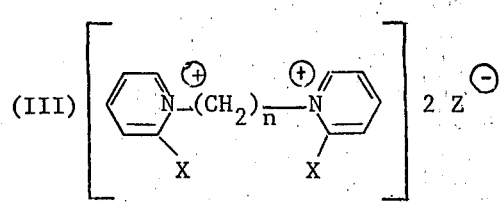

(III)

where X and n have the meanings assigned to them above.

In compounds of the above formula (III) it is preferred that n is 3–8.

Particularly preferred compounds are compounds of the above formula (III) wherein X is a chlorine atom.

Examples of anions are chloride, perchlorate and fluoroborate. The preferred anions since they render the compounds more stable are perchlorate and fluoroborate.

The method of the present invention finds particular use as a step in the preparation of photographic silver halide materials and according to a preferred embodiment of the present invention in a process for the production of a gelatino silver halide photographic material there is provided the steps of treating an aqueous gelatino silver halide emulsion with an aqueous solution of a compound of formula I or III and then coating the aqueous emulsion as a layer on a photobase.

Preferably from 0.1 g to 50 g of the compound of formula I per 100 g of gelatin in the solution are used in the method of the present invention.

The compounds of formula (I) may be prepared by quaternizing a halopyridine with the appropriate alkylating agent.

Compounds of formula (III) may be prepared by quaternizing pyridine with an $\alpha,\omega$ dihaloalkane, oxidising with alkaline potassium ferricyanide and then treating the bis-pyridone so formed with phosphoryl chloride.

PREPARATION OF 2-CHLORO-1-METHYL-PYRIDINIUM PERCHLORATE

2-Chloropyridine 6 g and 6.5 g dimethyl sulphate were mixed and warmed on a water bath until a vigorous reaction began. When the initial reaction had subsided, the mixture was heated on a steam bath for 1 hour giving a yellow viscous product. Any excess dimethyl sulphate was removed by washing with ether then the residue was dissolved in a minimum of cold water. A solution of 10 g sodium perchlorate in 10 ml water was added slowly with stirring and the white precipitate which formed was filtered. The product was suspended in 50 ml cold water, filtered and then dried over $P_2O_5$. M.p. 199° – 202°. Yields 4.2 g.

PREPARATION OF 1,1′TRIMETHYLENE-BIS-(2-CHLOROPYRIDINIUM PERCHLORATE)

1,3 Di-bromopropane 20.2 g and 17 g pyridine were warmed carefully on a water-bath. (A cold-water bath was needed to control the reaction once it had begun). After the reaction had subsided the mixture was heated for 15 mins. on a steam-bath then cooled, dry ether added and the solid filtered. The product was recrystallised from ethanol to give 24.8 g 1,1′trimethylene bis-pyridinium chloride m.p. 241°–3°.

18 g of the salt was dissolved in a small quantity of water and mixed with a saturated solution of 66 g $K_3Fe(CN)_6$ in water. The solution was cooled in ice-water and 60 ml of 40% NaOH added dropwise keeping temperature at about 10°C. The mixture was left overnight at room temperature then neutralised with acetic acid and extracted with chloroform. The dried chloroform solution was evaporated and the residue recrystallised from benzene to give 4.8 g 1,1′trimethylene bis(2-pyridone). m.p. 132°.

4.6 g of the bis-pyridone and 30 g phosphoryl chloride was refluxed for 2 hours, then the excess $POCl_3$ removed under vaccum. The solid was dissolved in 50 ml cold water and a solution of 10 g $NaClO_4$ in 10 ml water added with stirring. The solid was filtered, washed with water and recrystallised from acetone/water, adding a little ether to induce crystallisation.

Yield of 1,1′trimethylene bis(2-chloropyridinium) perchlorate 4.9 g m.p. 282°–3°.

The following compounds of formula I were prepared in a manner similar to that used to prepare 2-chloro-1-methyl-pyridinium perchlorate which is hereinafter referred to as compound 1.

Compound 2; 2-bromo-1-methyl pyridinium perchlorate

Compound 3; 2-iodo-1-methyl pyridinium iodide

Compound 4; 2,6-dichloro-1-methyl pyridinium perchlorate

Compound 5; 2,6-dibromo-1-methyl pyridinium perchlorate

Compound 6; 2,4-dichloro-1-methyl pyridinium perchlorate

Compound 7; 2-chloro-1-(2 phenylethyl) pyridinium bromide

Compound 8; 2-bromo-1-benzoylmethyl pyridinium bromide

Compound 9; 1,1'-trimethylene-bis-(2-chloropyridinium perchlorate)

Compound 10; 1,1'-octamethylene-bis-(2-chloropyridinium perchlorate), prepared in a manner similar to that used to prepare compound 9.

EXAMPLE

The compounds were tested by the scratch resistance method. This involves drawing a loaded stylus across a swollen gelatin layer, and determining the minimum weight required to scratch the surface.

The aqueous gelatin coating solutions were made up as follows:

Gelatin 17.5 g in water 150 ml soaked for 20 minutes and melted out at 60° for 10 minutes. The pH of this gelatin solution was adjusted to 6.5. Each test compound, 0.00125 moles, was dissolved in ethanol 25 ml/water 35 ml, and added to separate portions of the gelatin solution. The pH of the gelatin solutions was readjusted to 6.5 and made up to 250 mls with water, 200µ thick coatings were made with a doctor bar on film base and dried in a fan-assisted drying cabinet without heat.

The coatings were kept at 22°C, 50% RH and 43°C, 69% RH. Scratch measurements were made after 20 minutes soaking in water at 20°C.

The results obtained are shown in the accompanying Table.

TABLE

| Compound | After 3 Hrs keeping | 2 Days 22°C. 50% RH | 2 Days 43°C. 69% RH | 7 Days 22°C. 50% RH | 7 Days 43°C. 69% RH |
|---|---|---|---|---|---|
| Control | 30 g | 30 g | 30 g | 35 g | 40 g |
| 1 | 85 | 120 | 280 | 145 | 255 |
| 2 | 60 | 120 | 200 | 135 | 275 |
| 3 | 45 | 115 | 310 | 120 | 370 |
| 4 | 360 | 400 | 550 | 450 | 590 |
| 5 | 590 | 570 | 670 | 520 | 610 |
| 6 | 265 | 295 | 500 | 265 | 460 |
| 7 | 50 | 125 | 200 | 110 | 190 |
| 8 | 70 | 120 | 200 | 120 | 245 |
| 9 | 195 | 380 | 660 | 430 | 570 |
| 10 | 125 | 175 | 490 | 305 | 465 |

What we claim is:

1. A method of producing a hardened gelatin layer which comprises treating an aqueous gelatin solution with an aqueous solution of a 2-halopyridinium compound of the formula

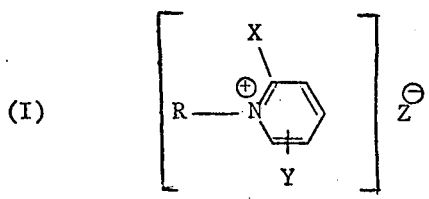

(I)

where X is a halogen atom, Y is a hydrogen or a halogen atom, Z is an anion and R is an alkyl, aralkyl, or aroylalkyl group, or a group of the formula

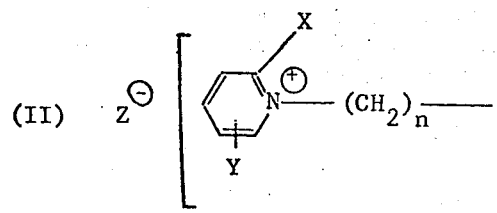

(II)

where X, Y and Z have the meanings assigned to them above and n is an integer of 2 to 12.

2. A method according to claim 1 wherein the 2-halopyridinium compound is a mono(2-halopyridinium) salt and Y is a halogen atom in the 2 or 4 positions.

3. A method according to claim 1 wherein the 2-halopyridinium compound is a mono(2-halopyridinium) salt and R is a methyl, phenylethyl or benzoylmethyl group.

4. A method according to claim 1 wherein the 2-halopyridinium compound is a mono(2-halopyridinium) salt and X is a chlorine or bromine atom.

5. A method according to claim 1 wherein the 2-halopyridinium compound is a bis(2-halopyridinium) salt of the formula

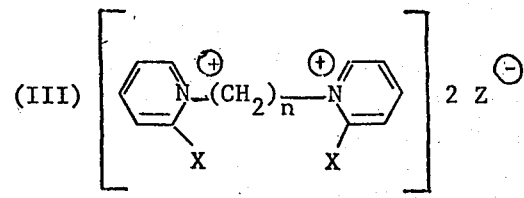

(III)

where X and n have the meanings assigned to them above.

6. A method according to claim 5 wherein X is a chlorine atom.

7. A method according to claim 1 wherein Z is a perchlorate or fluoroborate ion.

8. A method according to claim 1 wherein from 0.1 to 50 g of the 2-halopyridinium compound are used per 100 g of gelatin.

* * * * *